(12) United States Patent
Draxler et al.

(10) Patent No.: US 9,273,733 B2
(45) Date of Patent: Mar. 1, 2016

(54) MAIN BEARING CAP WITH LOCATING FEATURE

(71) Applicant: GKN Sinter Metals, LLC, Auburn Hills, MI (US)

(72) Inventors: Gary R. Draxler, Slinger, WI (US); Joel H. Mandel, Hartford, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 0 days.

(21) Appl. No.: 14/385,662

(22) PCT Filed: Apr. 25, 2013

(86) PCT No.: PCT/US2013/038190
§ 371 (c)(1),
(2) Date: Sep. 16, 2014

(87) PCT Pub. No.: WO2013/163410
PCT Pub. Date: Oct. 31, 2013

(65) Prior Publication Data
US 2015/0055902 A1    Feb. 26, 2015

Related U.S. Application Data

(60) Provisional application No. 61/638,901, filed on Apr. 26, 2012.

(51) Int. Cl.
| | |
|---|---|
| *F16C 35/00* | (2006.01) |
| *F16C 35/02* | (2006.01) |
| *F16C 9/02* | (2006.01) |
| *F16C 9/04* | (2006.01) |

(Continued)

(52) U.S. Cl.
CPC . *F16C 35/02* (2013.01); *F16C 9/02* (2013.01); *F16C 9/04* (2013.01); *F16C 43/02* (2013.01); *F16C 41/008* (2013.01)

(58) Field of Classification Search
CPC ........ F16C 35/02; F16C 9/02; F16C 2360/22; F16C 2226/80; F16C 2220/20
USPC .......................... 384/279, 430, 432–434, 902; 123/195 R; 419/66
See application file for complete search history.

(56) References Cited

U.S. PATENT DOCUMENTS

| | | | |
|---|---|---|---|
| 6,086,258 A | 7/2000 | Cadle et al. | |
| 6,435,723 B1 * | 8/2002 | Wolf et al. | 384/434 |

(Continued)

FOREIGN PATENT DOCUMENTS

| | | |
|---|---|---|
| EP | 2 602 498 A1 | 6/2013 |
| GB | 2 344 151 A | 5/2000 |

(Continued)

OTHER PUBLICATIONS

Machine translation of JP 7-305716 obtained on Mar. 24, 2015.*

(Continued)

*Primary Examiner* — Adam D Rogers
(74) *Attorney, Agent, or Firm* — Quarles & Brady LLP

(57) ABSTRACT

A bearing cap (10) in which each foot includes an elongated protrusion (36) formed thereon positioned between the bolt hole and a side of said foot, with its major axis parallel to the axis of the bore partially defined by the bearing cap and includes ribs on its side surfaces that are perpendicular to its major axis.

18 Claims, 2 Drawing Sheets

(51) Int. Cl.
*F16C 43/02* (2006.01)
*F16C 41/00* (2006.01)

(56) References Cited

U.S. PATENT DOCUMENTS

| | | | |
|---|---|---|---|
| 6,471,406 B1 * | 10/2002 | Cadle et al. | 384/433 |
| 7,168,858 B2 * | 1/2007 | Cadle et al. | 384/432 |
| 8,690,439 B2 * | 4/2014 | Dickinger et al. | 384/432 |
| 8,915,230 B2 * | 12/2014 | Brautigam | 123/195 R |
| 2007/0163830 A1 | 7/2007 | Donaldson et al. | |
| 2011/0158569 A1 | 6/2011 | Dickinger et al. | |

FOREIGN PATENT DOCUMENTS

| | | |
|---|---|---|
| JP | S60 8522 A | 1/1985 |
| JP | H07 305716 A | 11/1995 |
| WO | 2007/081715 A2 | 7/2007 |

OTHER PUBLICATIONS

International Search Report and Written Opinion as mailed on Jul. 18, 2013 for International Application No. PCT/US2013/038190.

\* cited by examiner

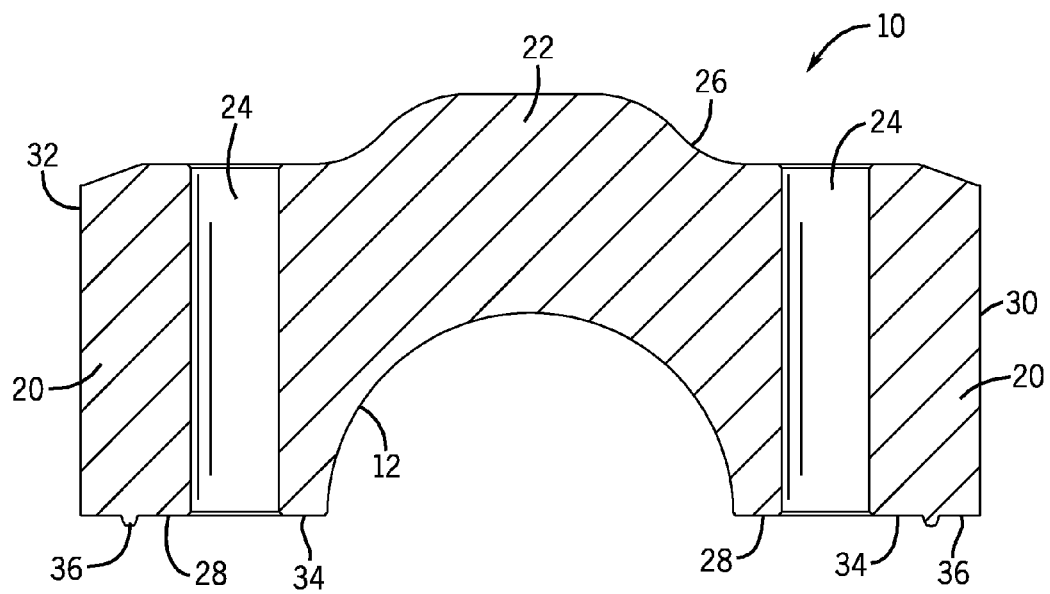
FIG. 3
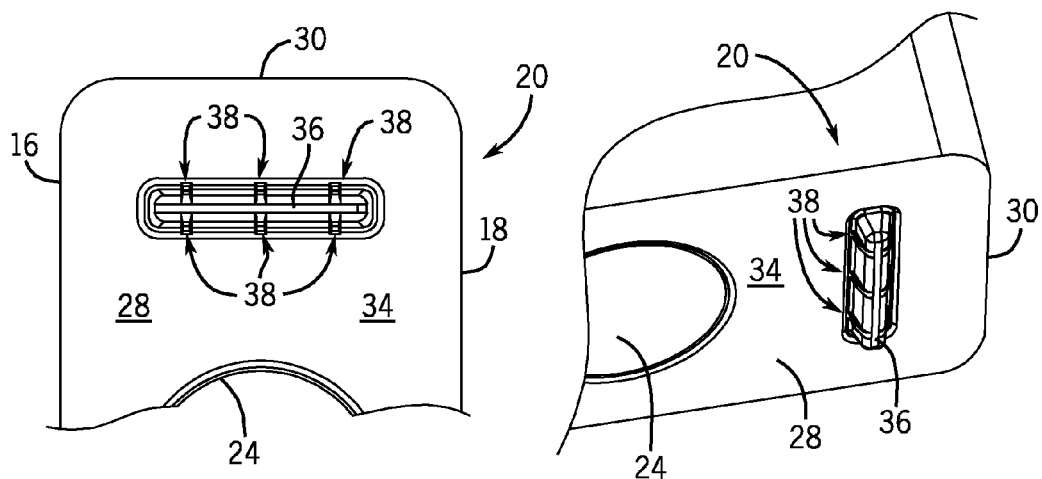
FIG. 4
FIG. 5

MAIN BEARING CAP WITH LOCATING FEATURE

CROSS-REFERENCE TO RELATED APPLICATIONS

This application represents the U.S. National Stage of International Application No. PCT/US2013/038190, filed Apr. 25, 2013 which claims the benefit of U.S. Provisional Patent Application Ser. No. 61/638,901 filed Apr. 26, 2012, which is hereby incorporated by reference for all purposes.

STATEMENT OF FEDERALLY SPONSORED RESEARCH OR DEVELOPMENT

Not applicable.

BACKGROUND

This invention relates to bearing blocks of the type in which a bearing supporting bore is formed with half of the bore in a support structure and the other half in a bearing cap which is secured to the support structure, in which the cap must be precisely refitted to the support structure after machining operations on the bore are carried out. In particular, this invention relates to a sintered powder metal bearing cap having features for providing precise relocation of the cap relative to the support structure.

The essential function of a bearing cap is to retain and locate a rotary shaft, or a bearing for a rotary shaft which in turn retains and locates the shaft, relative to a support structure. For example, the main bearing cap of an engine bolts to a bulkhead of the engine crankcase and together with the bulkhead retains and locates the crankshaft journal in place while the crankshaft is rotating. The crankshaft journal runs against two half shell bearings which are fitted to the main bearing cap and the engine bulkhead semi-circular bores, respectively.

In this case, for vibration free, low friction and quiet running, the roundness of the bore produced by the main bearing cap and the bulkhead is very important. This roundness is achieved by a machining operation called line boring. The main bearing caps are bolted to the bulkheads of the engine block, and then a boring bar fitted with a cutting tool is used to machine the bores in the assembly. This ensures the two half rounds formed by the main bearing cap and the bearing block form as near to a perfect circle as possible. A finishing operation involving a grinding hone is often used to achieve the extremely fine tolerances needed for quiet running and efficient engine performance.

However, to install the crankshaft, it is necessary to remove the main bearing caps from the engine block. After the crankshaft is put in place, the main bearing caps must be re-positioned on the bulkhead so that they are replaced in the identical position they occupied during the line boring operation. Any deviation from that original position produces an out-of-round condition that, in turn, leads to vibration, noise and possibly stiff, high friction crankshaft operation.

U.S. Pat. No. 6,086,258 entitled "Precisely Repositionable Bearing Cap" which issued on Jul. 11, 2000, and PCT International Patent Application Publication No. WO2007/081715 entitled "Precision Location and Low Force Repositioning of Powder Metal Components" which published on Jul. 19, 2007, are hereby incorporated by reference as if set forth herein in their entirety for all purposes. This patent and international patent application publication describe repositionable powder metal bearing caps having bosses around the bolt holes. These bosses extend from the bottom of the feet of the bearing cap into counterbores of the structure to which the bearing cap is assembled. However, forming these assemblies can potentially require large forces to press the bearing cap initially into the receiving structure and to withdraw the bearing cap for insertion of the crankshaft. Unfortunately, there also exists the possibility that if the parts are not joined closely enough to one another that foot fretting may develop under vibration.

Hence a continuing need remains for bearing caps that can be located relative to a component to which the bearing cap is joined without the implementation of excessive force and with a reduction in the occurrence of foot fretting.

SUMMARY OF THE INVENTION

An improved bearing cap is disclosed that has protrusions which are widely spaced apart on the bottom of the feet of the bearing cap. Among other things, the new structure helps to improve repositioning of the bearing cap during assembly to a bearing support structure and prevents left-to-right or side-to-side vibration which can induce foot fretting.

A bearing cap is disclosed of the type that is bolted to a bearing support structure so as to define a bearing bore between the cap and the structure. This bearing cap may be made of sintered powder metal. The bearing cap has bolt holes for securing the cap to the structure through the feet of the cap and into the bearing support structure using, for example, bolts. The cap has at least two feet with one foot on each side of the bore and with at least one bolt hole extending through each foot. Each foot has a protrusion formed on it that is disposed between the bolt hole and a side of said foot. In the embodiment disclosed, the protrusion is between the bolt hole and a lateral side of the foot.

In some preferred forms, a plurality of ribs may be formed on the protrusion. The ribs may be crush ribs that are plastically deformable (along with the bearing support structure) during assembly of the bearing cap to the bearing support structure. This will enable "perfect repositioning" of the main bearing cap into the block. Moreover, this can reduce foot fretting by locking the part to the block mechanically.

Unlike bosses that are formed around the bolt hole, the protrusion may be formed proximate a side of said foot such that any point along the protrusion is closer to the side than to the bolt hole. Accordingly, the protrusion is not integral with or central to the position of the bolt hole in that the protrusion does not need to be specially located relative to the bolt hole feature. Among other things, the use of protrusions formed near the lateral edges of the feet can help to locate and hold the part in the left-to-right direction within the engine block. This may be the case because by moving the protrusions laterally outward of the bolt holes, the protrusion-to-protrusion distance is increased which creates more exact and precise replacement of the cap during assembly to the block.

In one preferred form, the protrusion can be generally linear and extend in a direction generally perpendicular to a front side face and a rear side face of the bearing cap along the bottom surface. In this arrangement, the protrusion can include a plurality of ribs that extend in a direction generally perpendicular to a surface of the protrusion on which they are formed (such that the protrusions are roughly parallel with the front side face and the rear side face).

In some forms, the protrusion may be tapered as it extends away from the bottom surface of the foot. This can help to facilitate pressing of the protrusion in to the bearing support structure. The bearing support structure might have recesses that are adapted to receive the protrusions with interference between the protrusions and the recesses, which interference create plastic deformation of one of both of the protrusion and the recess.

To accommodate pressing into the bearing support structure (which is often aluminum), the sintered powder metal may be iron or an iron alloy which generally is a less deformable material. However, the ribs may be deformable relative to the generally softer material of the block, by engineering the ribs to have thinner sections or dimensions. Other material combinations and formulations may also be workable.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

FIG. 3 is a side cross-sectional view taken through the bearing cap along line 3-3 in FIG. 2.

FIG. 4 is a detailed bottom view of a portion of the bearing cap taken along line 4-4 of FIG. 2 that shows one of the protrusions in greater detail.

FIG. 5 is a detailed perspective view of one of the feet in which one of the protrusions is shown in greater detail.

DETAILED DESCRIPTION

Figure 1:
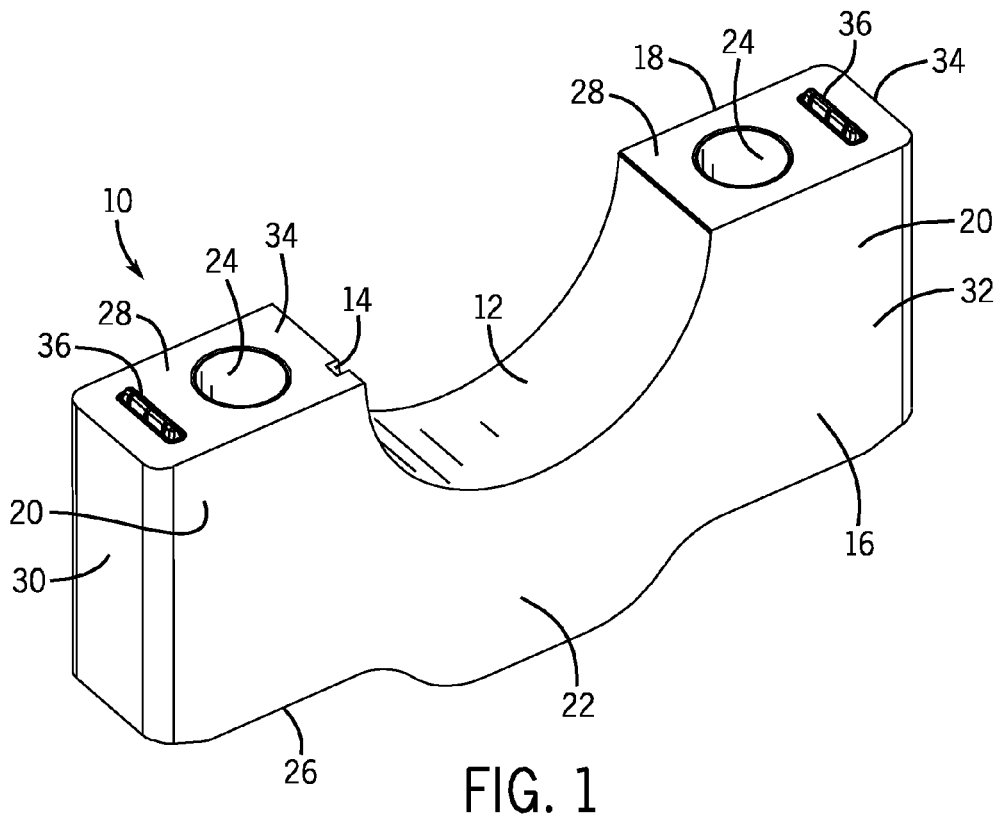
FIG. 1 is a perspective view of a main bearing cap according to one embodiment of the invention.
Figure 2:
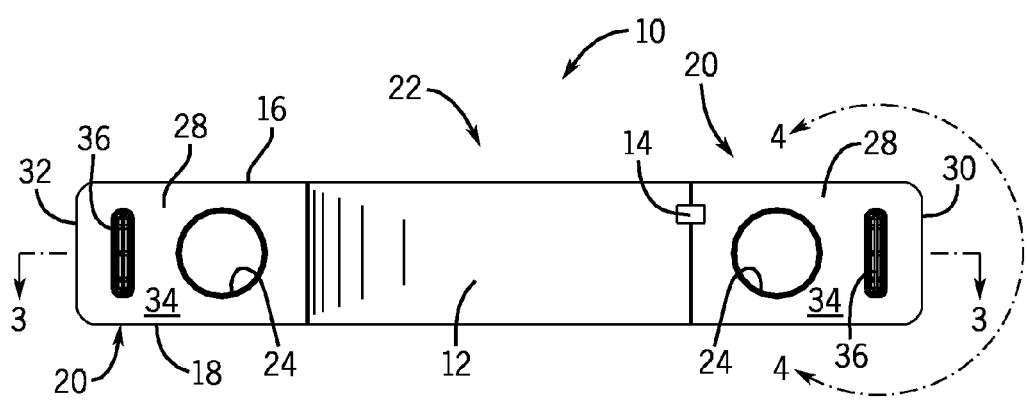
FIG. 2 is a bottom view of the bearing cap of FIG. 1.

FIGS. 1 through 5 illustrate one embodiment of a main bearing cap 10 according to the invention. The cap 10 defines a semicircular bore 12 which together with the semicircular bore of the engine bulkhead establishes the full bore through which the crankshaft of the engine extends and is journaled. Journal bearings may be received in the bore between the surface of the crankshaft and the surface of the bore, as is well known. The bearing cap 10 may be notched as at 14 to receive an ear of the journal bearings so as to prevent the journal bearings from rotating relative to the cap 10 and bulkhead. The semicircular bore 12 extends through the bearing cap 10 from a front longitudinal side 16 to a rear longitudinal side 18.

The bore 12 defines, on each of its lateral sides, a foot portion 20 of the cap 10. The two foot portions 20 are joined by a central bridge portion 22. A bolt hole 24 extends through each foot portion 20 from the top side 26 to the bottom side 28 of the cap 10. The cap 10 may also be provided with threaded set screw holes (not shown) extending from the lateral sides 30 and 32 at right angles into the respective bolt holes 24, so as to lock the retaining bolts in position after the cap 10 is bolted to the engine bulkhead support structure. Lateral sides 30 and 32 join the longitudinal sides 16 and 18 at the ends of the cap 10.

The bottom side 28 of each foot portion 20 includes a flat bottom surface 34. The pair of flat bottom surfaces 34 are co-planar with one another in the embodiment shown. However, in other embodiments, it is contemplated that these bottom surfaces need not be co-planar, but may instead be, for example, parallel with one another to facilitate uniaxial pressing during assembly.

A protrusion 36 is formed is formed on each of the flat bottom surfaces 34 of the foot portions 20 of the cap 10. The protrusions 36 are disposed between the bolt hole 24 and a lateral side 30 or 32 of each respective foot portion 20.

It will be appreciated that these protrusions 36 are separated from the bolt holes 24. This means that they are not directly involved with the alignment of the bolt holes 24 and are not integral with or essential to their position during initial pressing. This permits some amount of latitude and tolerance in the exact placement of these protrusions 36 on the bottom surface of the foot.

To be clear, these protrusions 36 are different from bosses which may be formed around the bolt holes 24 in that the protrusions 36 are formed proximate the lateral side 30 or 32 of each foot portion 20. Geometrically speaking, in the embodiment shown, for any given point along these protrusions 36, the protrusion 36 is closer to the lateral side 30 or 32 than to the corresponding bolt hole 24. In addition, the protrusions, as illustrated, are elongated, with their major axes (the axis that runs along its length dimension) parallel to the axis of the bore partially defined by the bearing cap, and with the ribs on its side surfaces perpendicular to its major axis.

By placing these protrusions on laterally spaced locations on the bottom surface of the feet, a wider or greater spread or distance is obtained between the protrusions than if they were bosses disposed around the bolt holes 24. This greater separation can help to better and more precisely locate the bearing cap during the re-positioning of the bearing cap on the support structure during re-assembly after the crankshaft has been inserted. In addition, the elongated shape and orientation thereof relative to the crankshaft bore axis also improves precise repositioning and stability.

In the particular form illustrated, the protrusions 36 are generally linear and extend in a direction generally perpendicular to the faces of the front side 16 and the rear side 18. Because the front side 16 and rear side 18 are perpendicular to the lateral sides 30 and 32, it can equally be said that these protrusions 36 are parallel with the lateral sides 30 and 32. Among other things, this orientation helps to prevent side-to-side lateral movement of the feet when the assembly vibrates during use, which can cause fretting of the feet.

As best seen in the detailed views of FIGS. 4 and 5, the protrusion 36 supports a plurality of ribs 38. In the form illustrated, in which the protrusions 36 are linear, the ribs 38 are disposed on opposing sides of the line of the protrusion 36 and in a direction perpendicular to the line of extension of the protrusion 36. Moreover, in the form shown, the ribs 38 are symmetrical about the medial line of the protrusion 36, with each of the ribs 36 having a matching rib 38 on the opposite side.

The ribs 38 are engineered to plastically deform along with the bearing support structure when the protrusion 36 is pressed into the bearing support structure. This plastic deformation can be achieved, for example, by making the ribs 38 to have thin walls. In contrast, the main body of the protrusion 36 underlying the ribs is designed to substantially retain its shape, such that the majority of the deformation occurs in the ribs 38 and the support structure.

As can be best seen in FIG. 5, the protrusions 36 also taper as they extend away from the foot portion 20. This permits the protrusions 36 to wedge into the material of the support structure into which they are received and spread it apart. As stated, recesses can be formed in the bearing support structure to receive the protrusions with interference upon initial assembly.

The improvements to the protrusions 36 and the deformable ribs 38 help to facilitate a "perfect reposition" of the main bearing cap into the mating structure during assembly upon re-assembly after insertion of the crankshaft.

This bearing cap 10 can be made using powder metallurgical processes by taking a powder metal material (such as, for example, iron or an iron alloy which usually includes some amount of binder or lubricant), compacting the powder metal material in a tool and die set to form a powder metal preform, and then sintering the powder metal preform to form a sintered powder metal part.

Among the advantages of using a powder metal process to make this bearing cap 10 is that the fine features of the protrusions 36 and the ribs 38 can be formed in the as-compacted preform. This means that little to no finishing work may be required to produce these features, which can save time and money in comparison to other methods of fabrication.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. In a bearing cap of the type which is bolted to a bearing support structure so as to define a bearing bore between said cap and said structure and in which bolt holes for securing said cap to said structure extend through feet of said cap and into said structure, said cap having at least two of said feet, one of said feet on each side of said bore with at least one bolt hole of the bolt holes extending through each one of said feet, wherein said cap is sintered powder metal, wherein the improvement comprises:

each of said feet include a protrusion formed thereon, each protrusion being disposed between the at least one bolt hole and a side of each foot wherein each protrusion is generally linear having opposing sides in which each of these opposing sides support a plurality of crush ribs;

wherein each protrusion supporting the plurality of crush ribs has a length less than the distance between two longitudinal side faces of the bearing cap, and wherein each foot has only one protrusion.

2. The bearing cap as in claim 1, wherein the side is a lateral side of each foot.

3. The bearing cap as in claim 1, wherein the plurality of ribs are plastically deformable along with the bearing support structure during assembly of the bearing cap to the bearing support structure.

4. The bearing cap as in claim 1, wherein each protrusion is formed proximate a lateral side of each foot.

5. The bearing cap as in claim 4, wherein any point along each protrusion is closer to the lateral side than to the at least one bolt hole.

6. The bearing cap as in claim 1, wherein each protrusion is not integral to the position of the at least one bolt hole.

7. The bearing cap as in claim 1, wherein each protrusion extends in a direction generally perpendicular to the two longitudinal side faces of the bearing cap.

8. The bearing cap as in claim 7, wherein the plurality of ribs extend in a direction generally perpendicular to a surface of each protrusion on which they are formed.

9. The bearing cap as in claim 1, wherein each protrusion is tapered as it extends away from each foot.

10. The bearing cap as in claim 1, wherein the sintered powder metal is iron or an iron alloy.

11. The bearing cap as in claim 1, wherein each protrusion is formed on a flat bottom surface of each foot.

12. The bearing cap as in claim 1, wherein the feet of the bearing cap comprise exactly two feet.

13. The bearing cap as in claim 1, wherein each protrusion is elongated.

14. The bearing cap as in claim 13, wherein each protrusion has a major axis that extends along an axis of the bearing bore.

15. The bearing cap as in claim 14, wherein the major axis of each protrusion is parallel with the axis of the bearing bore.

16. The bearing cap as in claim 14, wherein the plurality of ribs extend perpendicular to the major axis of each protrusion.

17. The bearing cap as in claim 13, wherein the plurality of ribs are adapted to be deformed plastically by the bearing support structure.

18. The bearing cap as in claim 13, wherein the plurality of ribs are adapted to plastically deform the bearing support structure.

* * * * *